Nov. 7, 1961  F. C. HUYSER ET AL  3,007,335
LOAD INDICATOR FOR TESTING MACHINE
Filed July 5, 1957  4 Sheets-Sheet 1

INVENTORS
Francis C. Huyser
BY Carl F. Pearson
Pollard, Johnston, Smythe & Robertson
ATTORNEYS

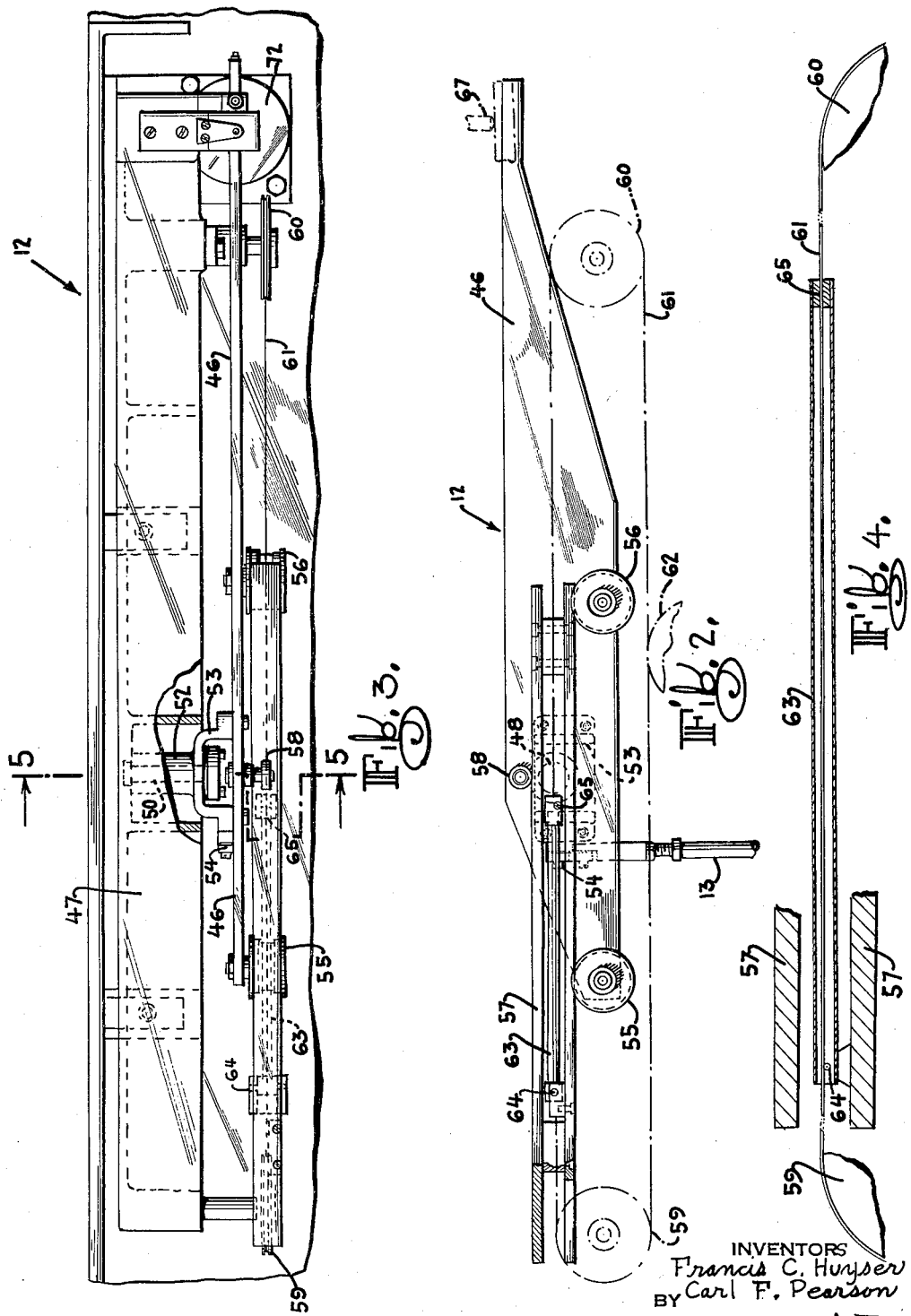

Nov. 7, 1961  F. C. HUYSER ET AL  3,007,335
LOAD INDICATOR FOR TESTING MACHINE
Filed July 5, 1957  4 Sheets-Sheet 3

INVENTORS
Francis C. Huyser
BY Carl F. Pearson
Pollard, Johnston, Smythe & Robertson
ATTORNEYS Nov. 7, 1961  F. C. HUYSER ET AL  3,007,335
LOAD INDICATOR FOR TESTING MACHINE
Filed July 5, 1957  4 Sheets-Sheet 4

INVENTORS
Francis C. Huyser
BY Carl F. Pearson
Pollard, Johnston, Smythe & Robertson
ATTORNEYS

United States Patent Office 3,007,335
Patented Nov. 7, 1961

3,007,335
LOAD INDICATOR FOR TESTING MACHINE
Francis C. Huyser and Carl F. Pearson, Moline, Ill., assignors to American Machine and Metals, Inc., New York, N.Y., a corporation of Delaware
Filed July 5, 1957, Ser. No. 670,094
5 Claims. (Cl. 73—88)

This invention relates to testing machines, and particularly to the indicating unit therefor.

In testing machines the force developed by the loading system is transmitted to the indicating unit which balances this force by another different but measurable force developed in the indicating system. In order to increase the speed of response and the precision of this counterbalancing effect it has been found advantageous to bring about this effect by using a servomechanism. The servomechanism moves a poise on the balancing beam in the proper direction whenever the beam is tilted from its normal position by the developed force of the loading system, so as to rebalance the beam and also indicate the developed force. In order to increase the utility of the machine, a change-of-range mechanism is incorporated in the machine, so that the degree of the reduction of the developed force of the loading system may be varied while the machine is in a loaded condition. Past change-of-range mechanisms required that the machine be unloaded prior to the changing of the range, with a consequent interruption of the test.

It is an object of this invention to provide an indicating unit for a testing machine which responds rapidly and measures accurately.

It is another object of this invention to provide an indicating unit for a testing machine, in which the force developed by the loading system is balanced by an electronically actuated mechanical load balancing and measuring device.

It is still another object of this invention to provide a change-of-range system for a testing machine, which permits the range of operation or proportion of the developed force of the loading system transmitted to the indicating unit, to be varied while the machine is in a loaded condition.

The invention is particularly adapted for use with a testing machine for testing the strength of materials. In such a machine the force developed by the loading system is balanced by a lesser proportional force developed in the indicating system. The indicating system includes a beam rotatable on a pivot and linkage means, having a plurality of ranges of operation, connecting the output of the loading system to the beam on one side of the pivot, the linkage means proportionally reducing the force transmitted to said one side of the beam. The amount of reduction of the force is dependent on the particular range of operation used. Indicating means are provided which register the force developed by the loading system. In order to actuate the indicator and to restore the beam to a balanced position, means are provided which are responsive to the angular movement of the beam about its pivot. In one aspect of the invention this means includes a differential transformer adjacent one end of the beam and a servomotor actuated thereby.

In one aspect, the change-of-range system of the testing machine of the invention is designed so that the ratio of the force at the output end of the reducing means to the developed force of the loading system may be varied while the machine has a developed force being applied thereto. The system includes an upper lever pivoted about a point intermediate its ends and connected to the output of the loading system on one side of its pivot. Connected adjacent one of its ends to the other side of the upper lever is a lower lever, the output of the reducing means or change-of-range system being at the other end of the lower lever. Spaced from the lower lever are a plurality of pins. Means are provided for selectively moving one of the pins into engagement with the lower lever so as to form a pivot point for the lower lever.

These and other objects, features and advantages of the invention wil become apparent from the following detailed description and drawings which are merely examplary.

In the drawings:

FIG. 2 is a front elevational view of the indicating unit mechanism;

FIG. 3 is a top plan view of the indicating unit mechanism;

FIG. 4 is an enlarged side elevational view of a portion of the indicating unit mechanism;

Figure 1:
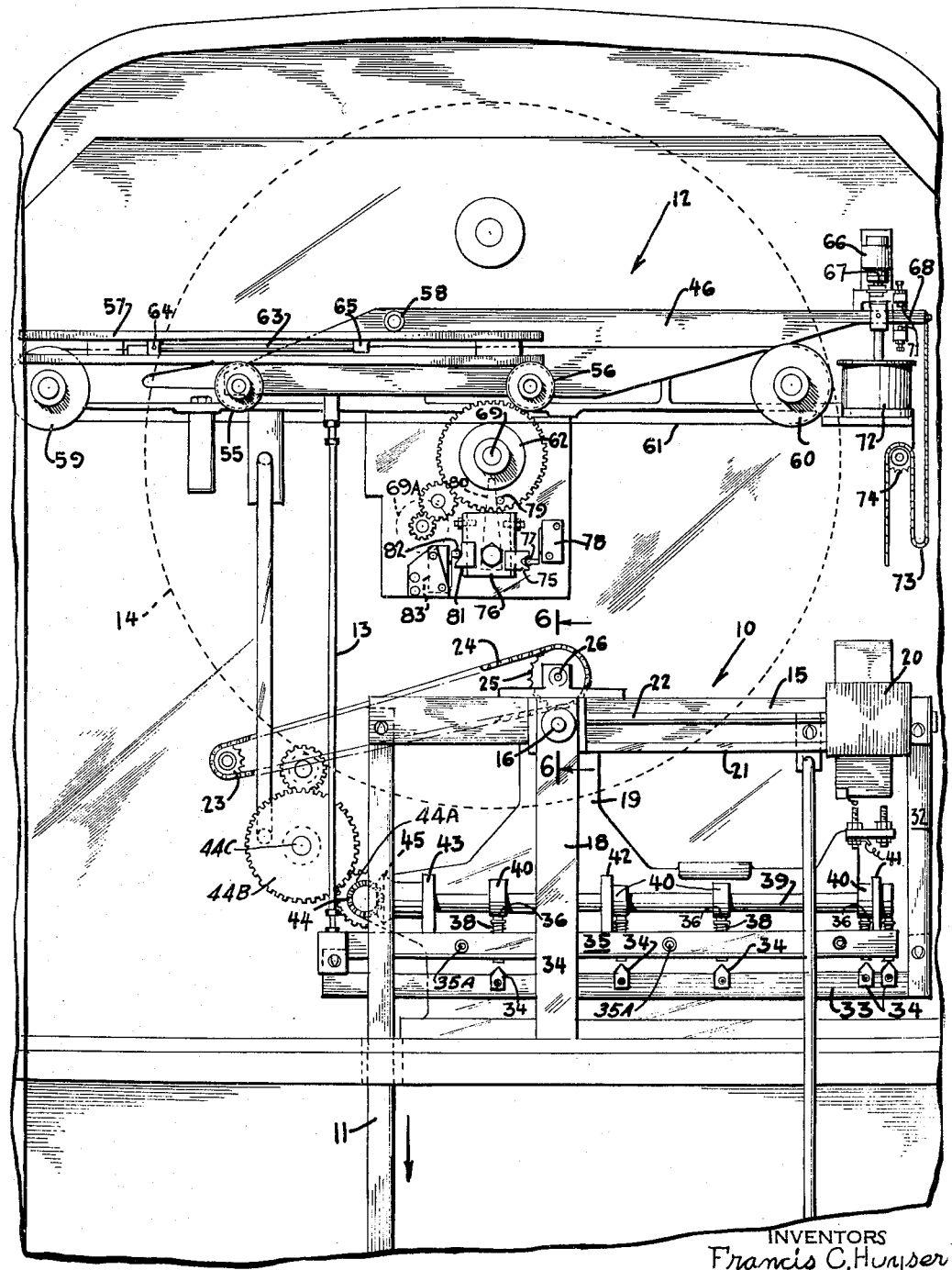
FIG. 1 is a front elevational view, with parts broken away, of the indicating unit and change-of-range system of the invention.
Figure 5:
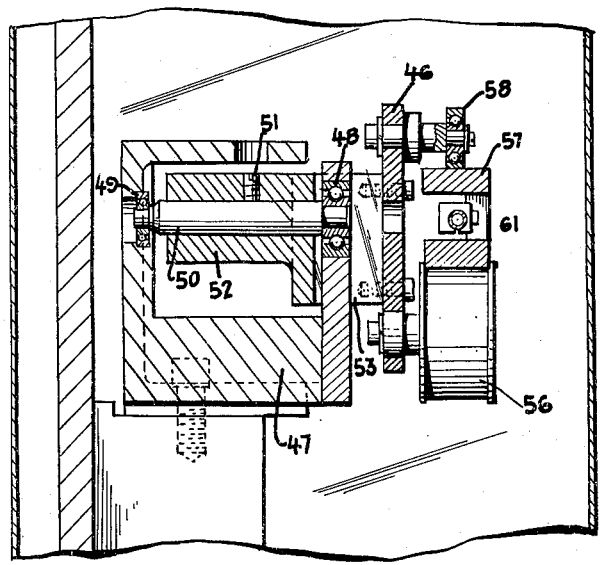
FIG. 5 is a cross sectional view taken along the line 5—5 of FIG. 3 looking in the direction of the arrows.

As shown in FIG. 1, the force developed by the loading system of the testing machine is transmitted, in the case of a screw power testing machine, to the change-of-range system, shown generally at 10, by a link 11. The reduced force developed by the change-of-range system is transmitted to the indicating unit, shown generally at 12, by a link 13. The developed load is balanced by the indicating unit which also indicates the amount of the load on an indicating dial 14, shown schematically by dotted lines in FIG. 1.

Figure 6:
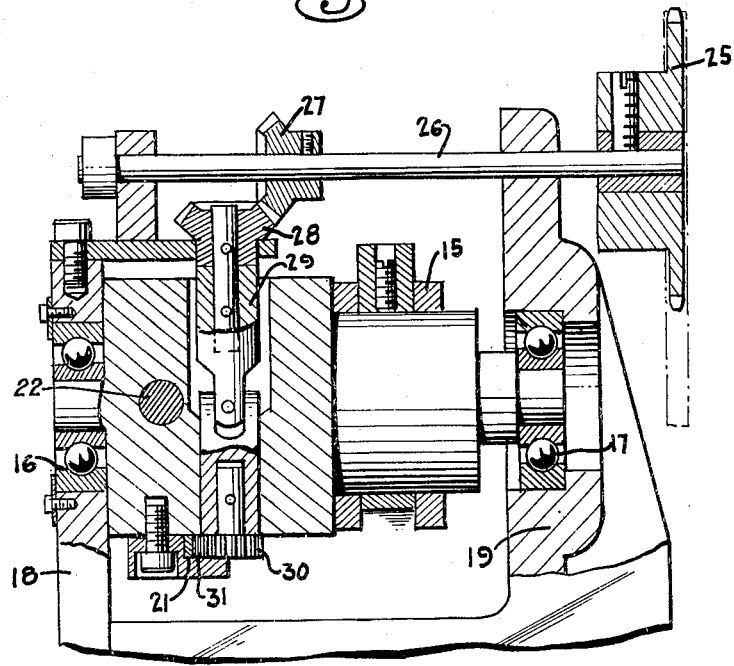
FIG. 6 is a cross sectional view taken along the line 6—6 of FIG. 1 looking in the direction of the arrows.

The force developed by the loading system and transmitted by link 11 is proportionally reduced by the change-of-range system 10. Link 11 is pivotally connected at its upper end to a longitudinally extending upper lever 15 which is pivotally mounted in bearings 16 and 17 in front and rear supports 18 and 19. As seen best in FIG. 6, in order to balance the force exerted by the machine before a load is applied by the loading system, an adjustable tare weight 20 movable by member 21 and guided by member 22, is provided. The tare weight is adjusted from the front of the machine by a suitable means, not shown, for rotating gear 23, which moves chain 24, which in turn rotates gear 25. The rotation of gear 25 causes rotation of shaft 26 and bevel gear 27 connected thereto. Bevel gear 27 engages bevel gear 28 so as to rotate flexible coupling or universal joint 29 to which it is connected and pinion gear 30 connected at the other end thereof. Pinion gear 30 engages rack 31 on member 21 to produce longitudinal movement thereof.

Figure 7:
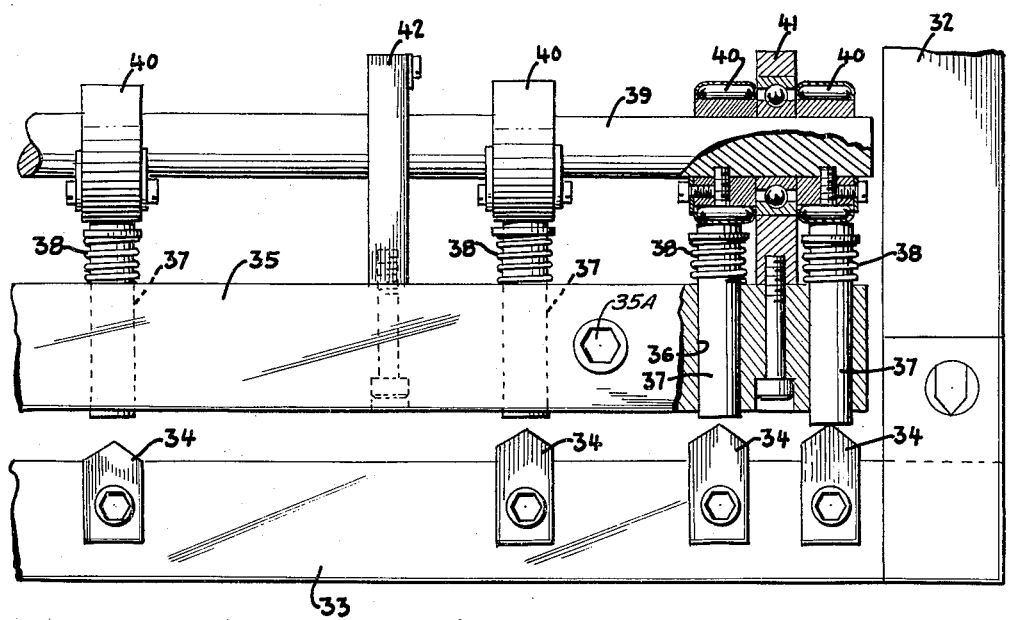
FIG. 7 is an enlarged front elevational view of a portion of the change-of-range system.

Pivotally connected to the right-hand end, as viewed in FIG. 1, of lever 15 is a vertically extending link 32 which in turn is pivotally connected at its other end to one end of a horizontally extending freely mounted lower lever 33. As best seen in FIG. 7, a plurality of knife edged elements 34 are mounted on the upper portion of lever 33 and extend above the top surface thereof. A bar 35 generally parallel to lever 33 and mounted thereabove has a plurality of vertically extending bores 36 aligned with and overlying their respective element 34. Bar 35 is stationary and is secured, as by bolts 35A, to rear support 19. Pins 37 are mounted within the bores and are urged upwardly therein by springs 38. A cam shaft 39 parallel to bar 35 and positioned thereover has a plurality of cams 40 fixed thereto which are mounted so that each one engages the top surface of its respective pin 37. Cam shaft 39 is suitably journalled in supports 41, 42, and 43. Shaft 39 is rotated by the rotation of bevel gear 44 which rotates bevel gear 45, so as to move the eccentric portion of the desired cam 40 into proper position to urge its respective pin 36 downwardly against its respective knife edged element 34. Bevel gear 44 is rotated in response to rotational movement of gear 44A keyed to the same shaft as bevel gear 44, gear 44A being in meshing engagement with gear 44B mounted on shaft 44C. Shaft 44C and gear 44B may in turn be rotated by a suitable control knob (not shown) at the front of the indicating system and secured to the other end of shaft 44C. The contact between the pin 36 which is in its lower position and its respective element 34 forms a pivot point or fulcrum for lower lever 33. Thus, if the fulcrum selected is the furthest one on the right, as seen in FIGS. 1 and 7, the proportional variation of force will be at its greatest and a larger load may be measured by the testing machine than if one of the fulcrums to the left of this fulcrum is selected. Due to the particular construction of the change-of-range system of the invention, the range of operation of the testing machine may be varied while the machine is in a loaded condition. This results primarily from the unidirectional motion of the pins 36 instead of the rotary motion of the direct cam-knife edge contact of conventional change-of-range systems. The particular structure shown also eliminates the need of repositioning the tare weight balance whenever the scale range is changed.

The output of the force reducing or change-of-range system 10 at the left-hand end, as viewed in FIG. 1, of lever 35 is transmitted by link 13 to indicating or balancing system 12. This system, as best seen in FIGS. 1 and 2–5, includes a pivotally mounted beam 46. A frame member 47 has bearings 48 and 49 therein in which pin 50 is rotatably mounted. Secured to pin 50, as by set screw 51, for rotation therewith is a member 52 having a U-shaped extension 53, the front surface of the legs of which are secured to the rear surface of beam 46 to form the pivotal mounting therefor. The upper end of link 13 is secured to the left-hand side, as viewed in FIG. 2, of a leg of extension 53 at 54, so that the downward force exerted by link 13 is applied at a point spaced from the pivot to cause pivotal movement of the beam.

Rotatably mounted on the lower portion of beam 46 are two axially aligned, spaced rollers 55 and 56 having circumferential grooves in their outer surface. A poise or counterbalance 57 travels within the grooves and is supported by the rollers 55 and 56. In order to hold the poise in position on rollers 55 and 56, a third rotatable roller 58 is mounted on beam 46 between and above rollers 55 and 56, so as to be adjacent to the top surface of poise 57.

Rotatably mounted on the frame adjacent the opposite sides of the indicating unit are two rollers 59 and 60 which carry an endless wire or band 61 in circumferential grooves in their outer surface. This band passes around a drum or driving roller 62, so that as drum 62 is rotated the band or wire moves in one direction or the other. The poise is formed on an upper and lower bar parallel to each other and connected together. In order to impart motion from the band to the poise, a tube 63 is pivotally connected at one end to the lower bar at 64. The wire or band is secured to the other end of the tube, as at 65, so that as the band is moved it moves the tube and also the poise. As best seen in FIG. 4, this tube arrangement maintains the upper strand of band or wire 61 in a horizontal position and prevents undesirable tensioning which might react to introduce an error in load induction when beam 46 and poise 57 are tilted slightly due to the load exerted.

In order to cause movement of drum 62 and wire 61 in response to pivotal movement of beam 46, a differential transformer 66 is provided which has a plunger 67 in contact with the right-hand extension 68 of beam 46. Movement of extension 68 causes actuation of the differential transformer which is suitably connected to a servomotor 69A. Actuation of the differential transformer actuates the servomotor 69A through an amplifier in a manner well known in the art, so as to rotate shaft 69 and drum 62 connected thereto and thereby move band 61 and poise 57 in the proper direction so as to rebalance beam 46. Also connected to shaft 69 for rotation therewith is a pointer (not shown) which indicates the load being applied to the test specimen.

If desired, a buzzer system actuated by contacts 70 and 71 may be provided so as to indicate to the operator when the rate of load application is higher than the servo system can follow. In order to eliminate flutter or undesirable motion of the beam a dash-pot arrangement, shown generally at 72, may also be provided.

A prebalance for the beam may be provided so as to zero the indicating unit 12 when the machine is unloaded and may include a chain 73 passing around a rotatable sprocket 74, so that the effective weight of chain 73 on the beam may be varied.

An arrangement may be provided for the purpose of de-sensitizing the drive mechanism when the motor approaches its maximum or minimum position. Cam 75 on pivoted carriage 76 engages a cam roller 77 connected to micro-switch 78, so that as carriage 76 is rotated in a counterclockwise direction by pin 79, moving in a clockwise direction, which contacts lever 80 secured to the carriage, the micro-switch is actuated and the mechanism is desensitized. Similarly, when the parts are reversed in operation and when cam 75 is moved toward cam roller 77 by the clockwise motion of carriage 76 imparted by counterclockwise movement of pin 79 it also actuates micro-switch 78 to desensitize the servomotor 69A to limit the torque as the poise approaches the end of its travel.

Cam 81 will actuate switch 83 to stop the main machine drive motor when full scale capacity of any range is reached.

Figure 8:
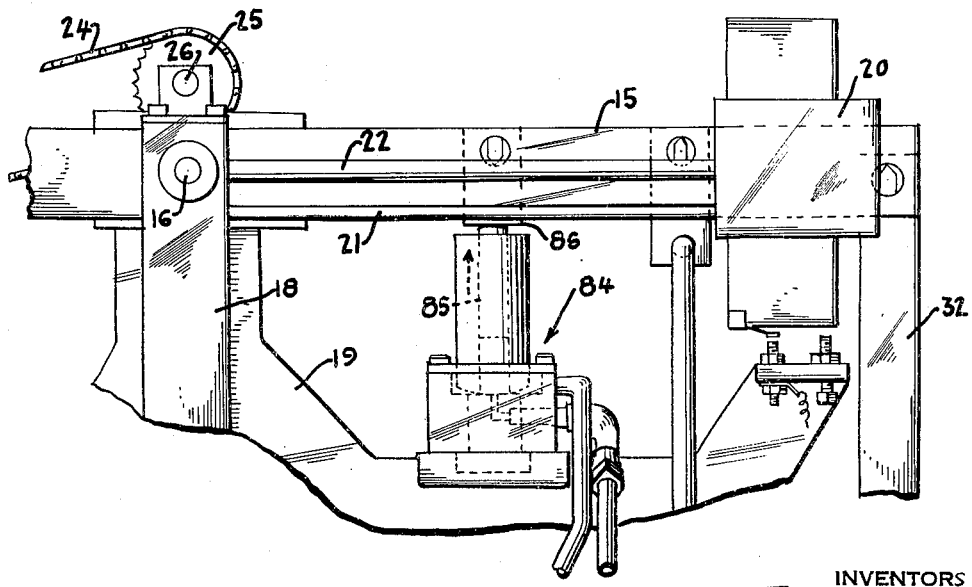
FIG. 8 is a front elevational view showing a modification of the manner of applying the load to the change-of-range system.

If the indicating unit and change-of-range system of the invention is to be used with a hydraulic pressure testing machine, the developed load is transmitted to upper lever 15 by a piston arrangement 84, shown in FIG. 8. The upper end of piston 85 is secured to upper lever 15 at 86 and is urged upwardly, in any known manner, as the developed force increases. Since this force is upward rather than downward, as in the case of the screw power testing machine previously described, it is exerted on lever 15 to the right of pivot 16 rather than to the left, as viewed in FIGS. 1 and 8. The operation of the remainder of the mechanism of the invention is identical to that described above for a screw power testing machine.

In summary, the force developed by the loading system of the testing machine is transferred to pivoted upper lever 15 and then to lower lever 33 pivoted, selectively, about any of the fulcrums 34. By selecting the proper fulcrum the force exerted at the free end of lever 33 can be increased or decreased, as desired, under the same developed load. The force at the free end of lever 33 is transmitted to beam 46 which rotates about its pivot and actuates differential transformer 66. Differential transformer 66 then actuates a servomotor which rotates drum 62, causing movement of wire or band 61. This moves poise 57 on rollers 55 and 56 to a new position so as to rebalance beam 46.

Due to the particular design of indicating unit 12, very little movement of beam 46 and, therefore, of lever 33 occurs. This movement is almost zero, or about .001 inch, thereby permitting the use of the manually operated change-of-range arrangement of the invention. In previous devices of this type, the end of the lower lever travelled a considerable amount, the movement sometimes approaching an inch. This degree of movement eliminates the possibility of changing the range of operation while the testing machine is in a loaded condition, and thus necessitates the time consuming operation of removing the load, changing the range, and then reapplying the load. This operation may also result in tests which are not entirely accurate due to the possibility of change in the test specimen.

It is to be understood that details of construction can be varied and that the machine and its parts can be used for various purposes without departing from the spirit of the invention except as defined in the appended claims.

What is claimed is:

1. In a machine for testing the strength of materials, in which the force developed by the loading system is balanced by a lesser proportional force in the indicating system therefor, a balanced beam indicating system comprising a beam rotatable on a pivot; a force transmitting mechanism including an upper lever mounted for rotation about a fixed pivot and connected at one end to the output of the loading system, a lower lever, one end of which is connected to the other end of said upper lever and generally parallel thereto, a plurality of fulcrums spaced from said lower lever and spaced apart along the effective longitudinal length of said lower lever, and means for selectively moving one of said fulcrums into engagement with said lower lever so that said lower lever is pivoted thereon, said force transmitting system proportionally reducing the force generated by said loading system, the degree of said reduction being dependent upon the particular fulcrum in engagement with said lower lever; means connecting the other end of said lower lever to the beam on one side of its pivot, said beam moving a predetermined angular distance for a particular fulcrum and a predetermined force developed by said loading system, a balancing poise mounted on said beam and parallel thereto, electrical means responsive to pivotal movement of said beam for moving said poise relative to said beam so as to return said beam to a balanced position on said pivot, and indicating means for registering the force developed by said loading system at all ranges of operation of said indicating system, said electrical means actuating said indicating means.

2. In a machine for testing the strength of materials, in which the force developed by the loading system is balanced by a lesser proportional force produced by linkage means in response to said developed force, a beam rotatable on a pivot and connected on one side of said pivot to the output of said linkage means, a balancing poise mounted on said beam and parallel thereto, electrical means responsive to pivotal movement of said beam for moving said poise relative to said beam so as to return said beam to a balanced position on said pivot, a pair of longitudinally spaced pulleys, a tube pivotally mounted adjacent one of its ends to said poise, a band movably mounted on said pulleys and passing through said tube, said band being attached to said tube adjacent the other of its ends so that said band will remain in substantially the same plane even when the beam is tilted and so that said band moves about said pulleys when said poise is moved, and indicating means for registering said developed force, said electrical means actuating said indicating means.

3. In a machine for testing the strength of materials, in which the force developed by the loading system is balanced by a lesser proportional force, means for proportionally reducing said developed force comprising an upper lever pivoted about a point intermediate its ends and connected to the output of the loading system on one side of said point, a lower lever connected adjacent one of its ends to the other side of the upper lever, the output of said reducing means being at the other end of said lower lever, a plurality of pins spaced from said lower lever, said pins being spaced apart along the effective longitudinal length of said lower lever, and means for selectively moving each of said pins into engagement with said lower lever, thereby forming a pivot point for said lower lever so that the ratio of the force at said output end of the reducing means to the developed force can be varied while the machine has a developed force being applied thereto.

4. In a machine for testing the strength of materials, in which the force developed by the loading system is balanced by a lesser proportional force, means for proportionally reducing said developed force comprising an upper lever pivoted about a point intermediate its ends and connected to the output of the loading system on one side of said pivot, a lower lever connected adjacent one of its ends to the other side of said upper lever, the output of said reducing means being at the other side of said lower lever, a bar parallel to said lower lever and carrying a plurality of pins spaced a predetermined distance from each other on said bar so as to be longitudinally spaced from each other along the effective length of said lower lever, said pins being normally urged away from said lower lever, a cam shaft adjacent said bar and having a plurality of cams thereon placed so as to contact their corresponding pins, and means for rotating said shaft to selectively move said pins into engagement with said lower lever, thereby forming a pivot point for said lower lever so that the ratio of the force at said output end of the reducing means to said developed force can be varied while the machine has a developed force being applied thereto.

5. In a machine for testing the strength of materials, in which the force developed by the loading system is balanced by a lesser proportional force, means for proportionally reducing said developed force comprising an upper lever pivoted about a point intermediate its ends and connected to the output of the loading system on one side of said point, a lower lever connected adjacent one of its ends to the other side of the upper lever, the output of said reducing means being at the other end of said lower lever, a plurality of pins spaced from said lower lever, said pins being spaced apart along the effective longitudinal length of said lower lever and means for selectively moving each of said pins into engagement with said lower lever, thereby forming a pivot point for said lower lever so that the ratio of the force at said output end of the reducing means to the developed force can be varied while the machine has a developed force being applied thereto, a beam rotatable on a pivot and connected on one side of said pivot by linkage means to the output of said reducing means, a balancing poise mounted on said beam and parallel thereto, a differential transformer which is energized by pivotal movement of said beam, a servomotor energized by said differential transformer in response to the latter's energization, and mechanical means responsive to the energized servomotor for moving said poise relative to said beam.

References Cited in the file of this patent

UNITED STATES PATENTS

| 2,390,696 | Dimick | Dec. 11, 1945 |
| 2,502,009 | Huyser | Mar. 28, 1950 |
| 2,768,823 | Lindars | Oct. 30, 1956 |
| 2,831,672 | Gerondeau | Apr. 22, 1958 |

FOREIGN PATENTS

| 731,094 | Germany | Feb. 1, 1943 |